Figure 1:
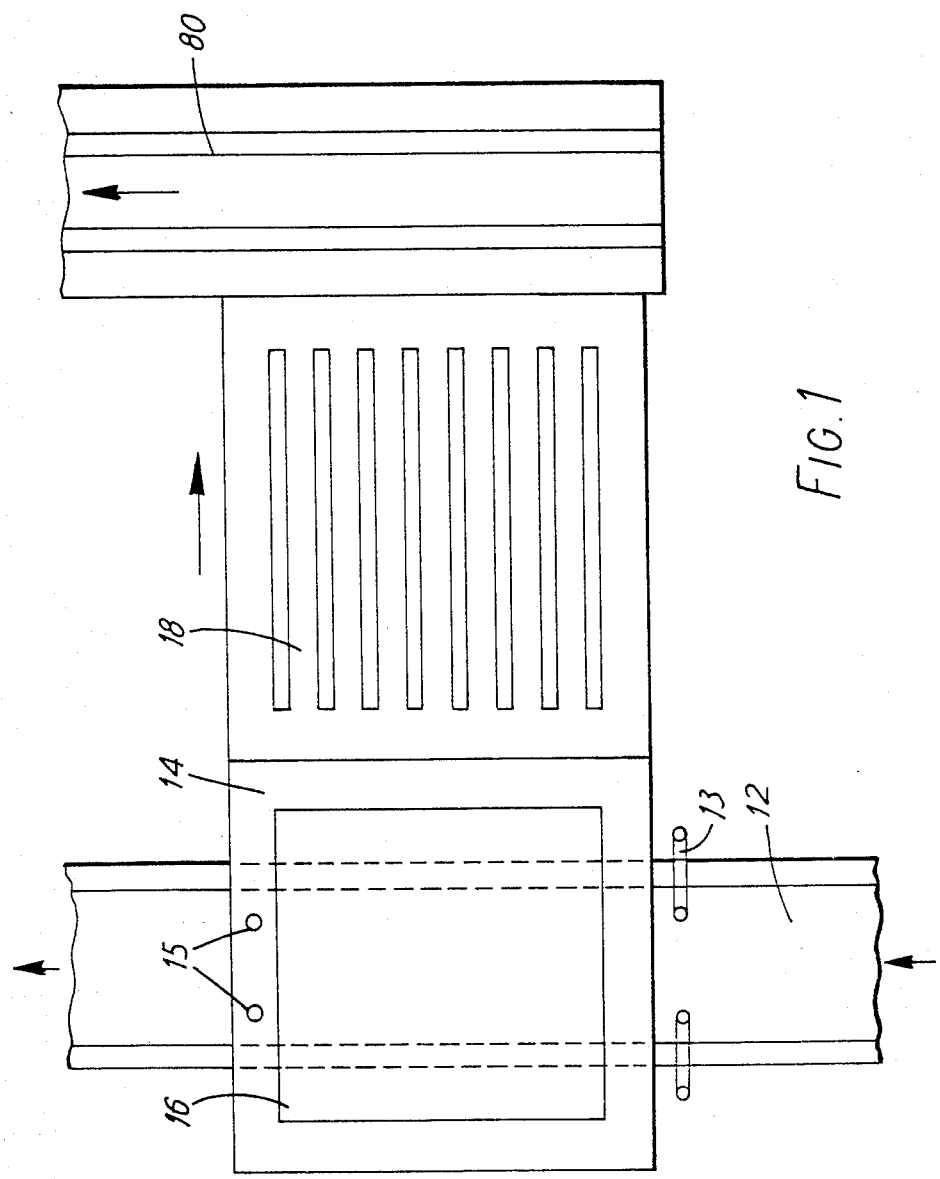

United States Patent [19]

Avey

[11] Patent Number: 4,516,900
[45] Date of Patent: May 14, 1985

[54] DE-PALLETIZER

[75] Inventor: Kenneth F. C. Avey, Epping, England

[73] Assignee: The British Matthews Limited, Epping, Great Britain

[21] Appl. No.: 426,766

[22] Filed: Sep. 29, 1982

[30] Foreign Application Priority Data

Aug. 12, 1982 [GB] United Kingdom ................ 8223242

[51] Int. Cl.³ ............................................. B65G 49/00
[52] U.S. Cl. .................................. 414/417; 414/120; 414/751; 198/412; 198/486
[58] Field of Search .............. 414/416, 417, 749, 117, 414/120, 751; 198/412, 486, 457

[56] References Cited

U.S. PATENT DOCUMENTS

| 3,019,925 | 2/1962 | Gray | 414/417 |
| 3,688,919 | 9/1972 | Snider | 414/117 X |
| 3,866,883 | 2/1975 | Goransson | 414/120 X |

FOREIGN PATENT DOCUMENTS

| 1228992 | 11/1966 | Fed. Rep. of Germany | 414/416 |
| 2618173 | 10/1977 | Fed. Rep. of Germany | 414/416 |
| 0772958 | 11/1980 | U.S.S.R. | 198/457 |

Primary Examiner—Robert J. Spar
Assistant Examiner—Ken Muncy
Attorney, Agent, or Firm—Louis Orenbuch

[57] ABSTRACT

A de-palletizer for removing articles such as kegs or drums from a pallet utilizes a conveyor to move the pallets, one at a time, to an unloading station where a mechanism pushes the articles from the pallet on to a discharge table. The unloaded pallet is removed from the unloading station before another loaded pallet is moved into that station. To enable the articles to be easily pushed off the pallet, a tilting mechanism causes the articles to tilt on edge as the articles are pushed toward the discharge table, with the articles tilting away from the discharge table. The tilting mechanism is mounted on a reciprocating carriage carrying a pusher plate. When the carriage moves toward the discharge table, articles on the pallet are pushed by the plate toward that table. To cause the articles to tilt away from the table, the pusher plate has a protruding bar that engages the lower portion of the articles. Situated at the front of the carriage is a hinged flap which applies force to the upper portions of the articles in the direction opposite to the force exerted by the protruding bar of the pusher plate. Consequently, a force couple is set up that causes the articles to tilt away from the front of the carriage. Because the tilting mechanism is mounted on the carriage, the tilting mechanism moves along with the articles as those tilted articles travel toward the discharge table. When the carriage moves back to its initial position, the hinged flap is moved out of the way to enable another loaded pallet to enter the unloading station.

7 Claims, 6 Drawing Figures

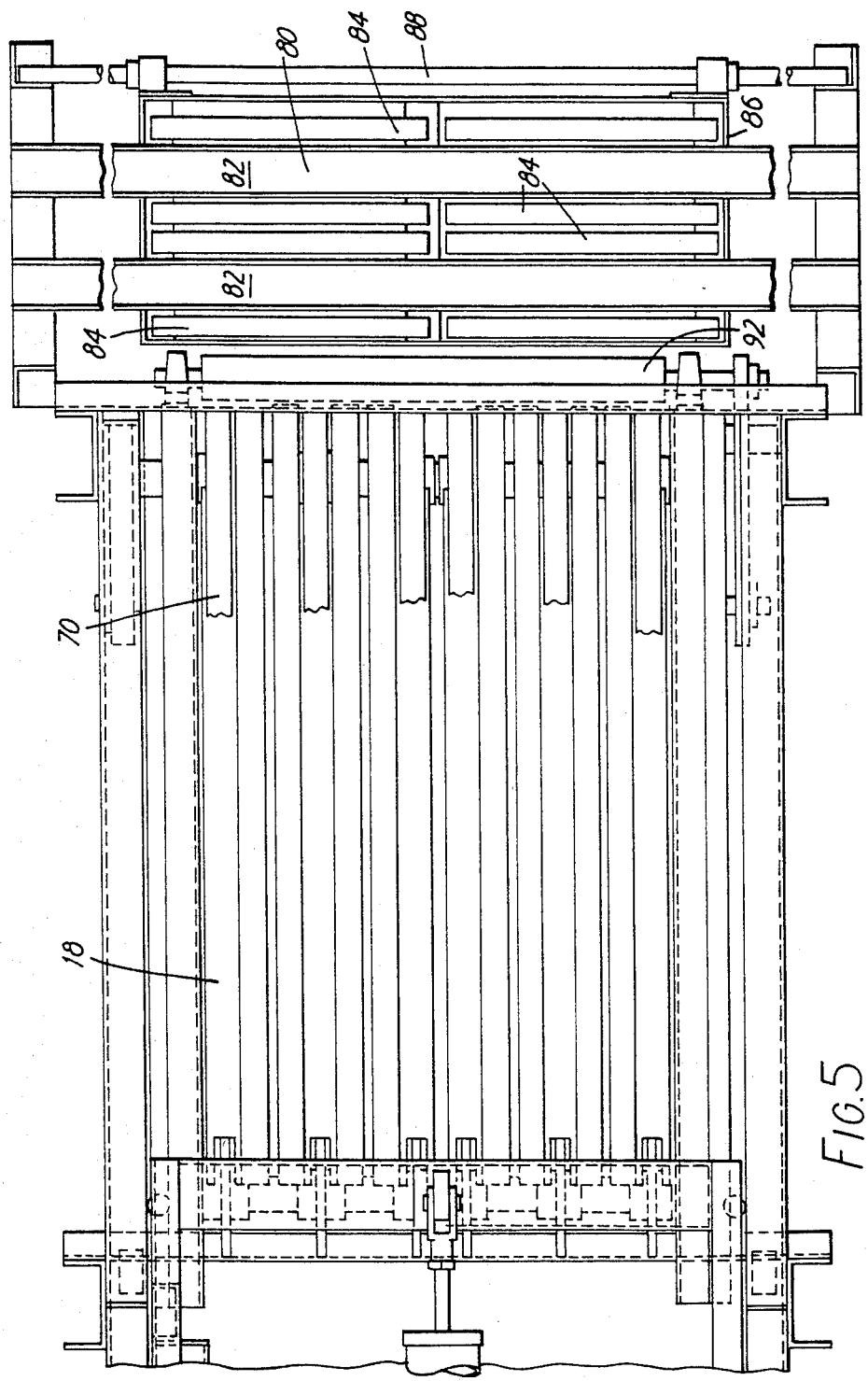

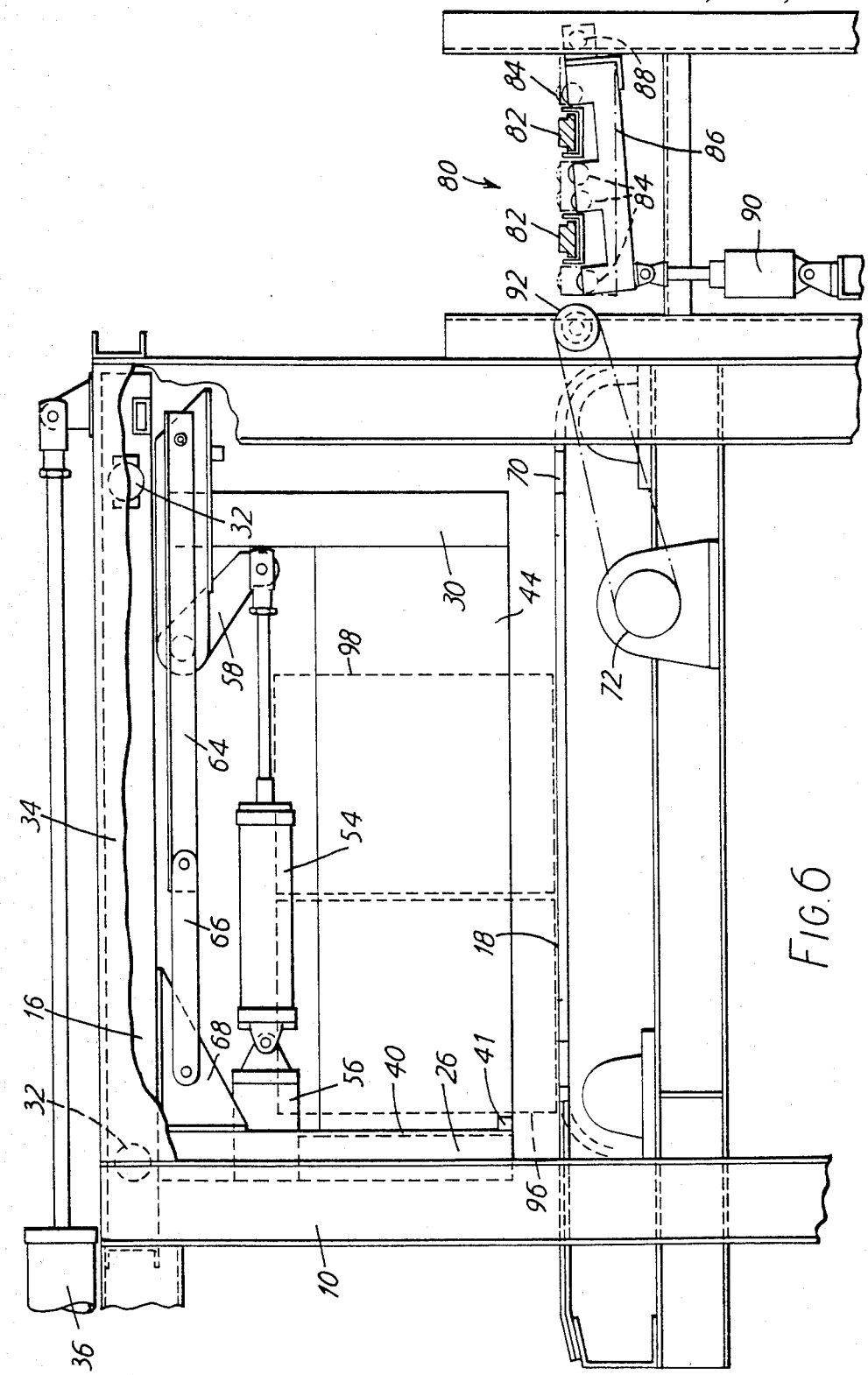

DE-PALLETIZER

This invention relates to de-palletizers for removing articles such as kegs or drums from pallets.

More particularly, the invention relates to de-palletizers for removing such articles standing upright on a pallet. Such de-palletizers usually comprise a pallet conveyor for moving loaded pallets to an unloading station, pusher means operable to push an array of articles from a pallet at the unloading station onto a discharge table, and means for discharging articles from the discharge table.

A problem which can arise with such apparatus, particularly when unloading slatted wooden pallets, is that the bottom rim of a keg can get caught against a slat of the pallet as it is being moved by the pusher. For example, if a slat of the pallet is missing, the keg can drop slightly as it moves over the gap left by the missing slat and strike the next slat, with the risk of damage to the keg or pallet or of jamming the apparatus.

It is an object of this invention to provide a de-palletizer which overcomes the above-mentioned disadvantage.

This invention consists in a de-palletizer of the kind referred to, in which means are provided for tilting the articles towards the pusher means as they are pushed from the pallet to the discharge table.

By tilting the articles, so that the lower leading edges of the articles are raised somewhat from the pallet, the risk of the articles catching against slats of the pallet is eliminated.

Preferably, the pusher means comprises a horizontally movable carriage having a pusher at its rear end and having at its forward end a retractable member adapted to engage articles and move them towards the pusher, the pusher being shaped so that such movement of the article causes them to be tilted towards the pusher.

The pusher may comprise a vertical pusher plate provided at its lower edge with a forwardly projecting bar adapted to engage the articles as they are moved by the said retractable member. The retractable member may be a horizontal bar carried by a flap pivoted to the carriage about a horizontal axis vertically spaced from the bar.

Advantageously, there is provided between the unloading station and the discharge table a member having an upper face which slopes downwards from the discharge table to a level below the level of the upper face of a pallet on the discharge table, to facilitate the movement of articles onto the discharge table, particularly when the upper face of the pallet is below the expected level, for example if the pallet is damaged.

Figure 2:
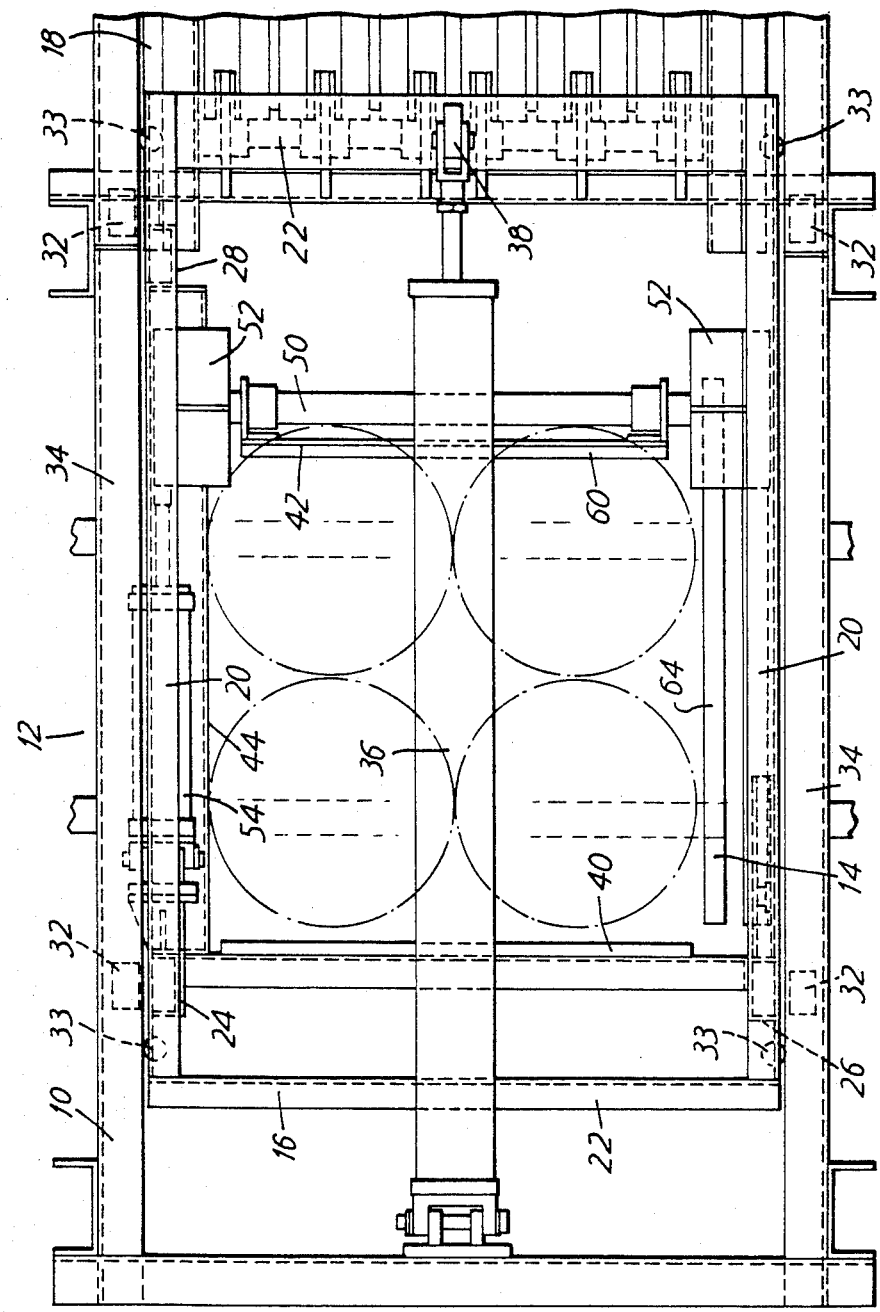
Figure 3:
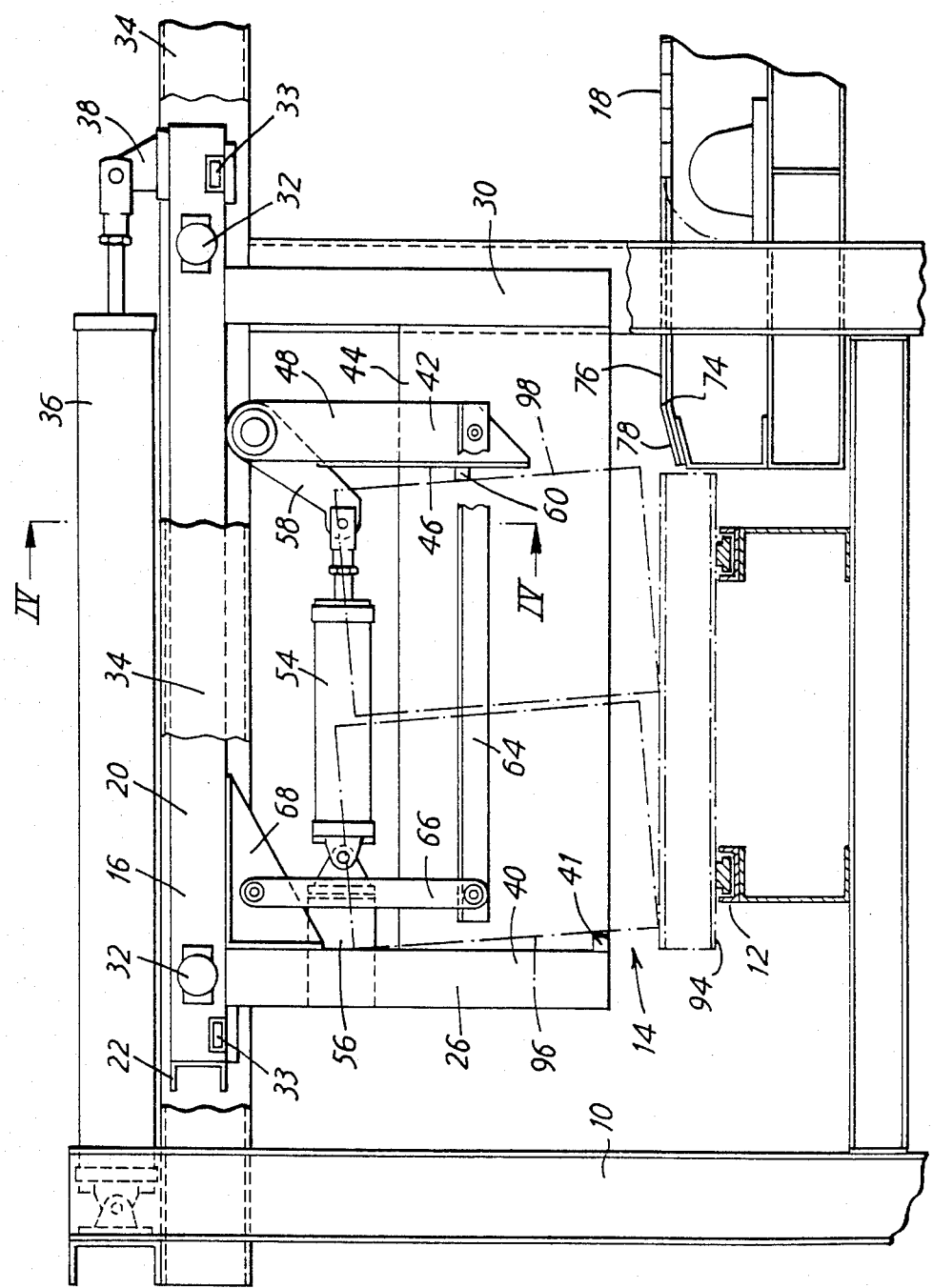
Figure 4:
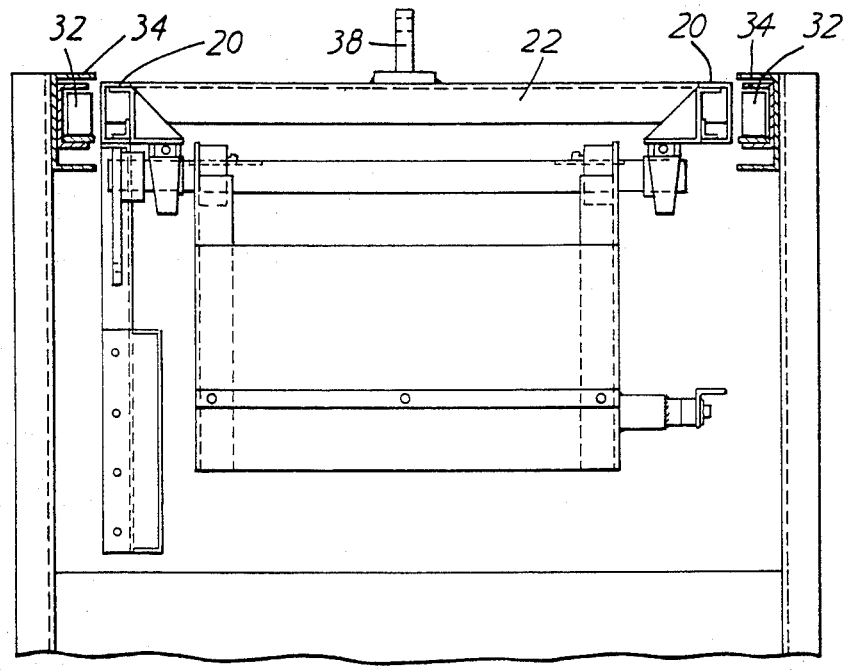

The invention will now be described, by way of example, with reference to the accompanying drawings, in which:

FIG. 1 is a diagrammatic plan view showing the general layout of a keg de-palletizer in accordance with the invention, FIG. 2 is a plan view, on a larger scale, of the loading station and carriage of the apparatus, FIG. 3 is a side elevation of the loading station and carriage, FIG. 4 is a section on line IV—IV of FIG. 3, FIG. 5 is a plan view of the discharge table and discharge conveyor of the apparatus, FIG. 6 is a side elevation of the discharge table and discharge conveyor, showing the carriage in position over the discharge table.

Referring to the drawings, a de-palletizer for removing kegs from pallets comprises a main frame 10, a pallet conveyor 12 on which loaded pallets are moved to an unloading station 14 and empty pallets discharged from the unloading station, a reciprocating carriage 16 which acts to push kegs from a pallet at the unloading station onto a discharge table 18, and a discharge conveyor 80 on which the unloaded kegs are discharged from the apparatus.

The pallet conveyor 12 is a horizontal chain conveyor which extends through the unloading station 14 and is driven by a suitable motor (not shown). An escapement 13, which may be of well-known form, is provided to control the movement of loaded pallets one at a time to the unloading station 14. Retractable stops 15 at the output side of the unloading station are positioned to arrest each pallet at the appropriate position in the unloading station and to allow the empty pallet to be discharged on the conveyor 12 after kegs have been removed from it. Squaring clamps of known form may be provided on the input side of the unloading station 14, to ensure that each pallet is positioned correctly on the conveyor 12 before entering the unloading station.

The carriage 16 has a rectangular frame 18 comprising two longitudinal beams 20 and two cross-beams 22, and four vertical legs 24, 26, 28 and 30 extending downwards from the four corners of the frame. The carriage is suspended from the main frame 10 of the apparatus by means of four rollers 32 rotatably mounted on the two longitudinal beams 20 and running in tracks formed by horizontal channel members 34 of the main frame. The carriage is guided laterally by four wheels 33, rotatable about vertical axes, which run against the vertical faces of the channel members 34. The carriage 16 is reciprocable horizontally in the main frame 10, in a direction perpendicular to the longitudinal axis of pallet conveyor 12, by means of a double-acting air cylinder 36 positioned above the carriage and acting between the main frame 10 and a bracket 38 fixed to the front cross-beam 22 of the carriage.

A vertical flat pusher plate 40 is fixed to and extends between the rear legs 24 and 26 of the carriage. A square-section bar 41 extends across the front face of the pusher plate next to its lower edge. A stop plate 44 at right angles to the pusher plate 40 extends along the side of the carriage on the pallet discharge side, the stop plate being fixed to one rear leg 24 and one front leg 28 of the carriage 16.

At the end of the carriage 16 opposite the pusher plate 40 is a retractable flap 42. The flap 42 comprises a steel plate 46 carried by two arms 48 which are fixed at their upper ends to a horizontal shaft 50. The shaft 50 is mounted in bearings 52 fixed to the longitudinal beams 20 of the carriage 16, so as to be rotatable about a transverse horizontal axis. Rotation of the shaft 50 effects movement of the flap 42 between a vertical position (as shown in FIG. 3) in which the flap can engage kegs as described below and a horizontal position (as shown in FIG. 6) in which the flap can move over the tops of kegs on the discharge table 18 when the carriage is retracted as described below. Rotation of the shaft 50 is effected by a double-acting air cylinder 54 pivotally connected to a bracket 56 fixed to rear leg 24 of the carriage and having its rod connected to a bell-crank arm 58 fixed to the end of shaft 50. A square-section bar 60 is fixed to the flat face of steel plate 46, the bar extending horizontally and spaced from the bottom edge of the flap 42. The bar 60 is positioned to engage kegs at about their mid-height when the kegs are positioned on a pallet at the unloading station.

A side guide bar 64 extends horizontally along the side of the carriage 16 opposite the stop plate 44. The side guide bar is pivoted at its front end to one of the support arms 48 of the flap 42, and is pivoted at its rear end to the lower end of a guide arm 66 which is itself pivoted at its upper end to a gusset plate 68 fixed to the frame 18 of carriage 16. The guide arm 66 is parallel to the flap support arm 48 so that when the flap 42 is raised to its horizontal position the side guide bar 64 and guide arm 66 are also raised to a position which allows kegs on a loaded pallet to pass beneath them as a pallet moves into the unloading position, as described below.

The bar 41 on the pusher plate 40 and the bar 60 on the flap 42 are positioned so that, in operation as described below, the bar 41 engages the adjacent two kegs 96 in the array near their lower edges and the bar 60 engages the other two kegs 98 near their mid-height. The horizontal separation between the two bars 41 and 60 when the flap 42 is in its lowered position is less than the overall width of the array of kegs, so that the kegs are tilted towards the pusher plate 40 as shown in broken lines in FIG. 3.

The discharge table 18 comprises a number of parallel endless chains 70 extending in a direction parallel to the direction of movement of the carriage 16 and driven in the manner of chain conveyor by an electric motor 72. The upper face of the chains 70 is at a slightly lower level than the upper face of a pallet on conveyor 12 at the unloading station 14. Between the conveyor 12 and discharge table 18 is a discharge plate 74 fixed to the main frame 10 and extending across the full width of the discharge table. The discharge plate 74 has a horizontal portion 76 at the same level as the chains 70 of the discharge table, and an inclined portion 78 which slopes downwards from the horizontal portion towards the pallet conveyor 12.

The discharge conveyor 80 comprises a driven chain conveyor having chains 82 extending at right angles to the chains 70 of the discharge table 18. To assist the movement of kegs onto the discharge conveyor, rollers 84, each freely rotatable about a horizontal axis parallel to the direction of movement of kegs on the discharge conveyor 80, are positioned between and on both sides of the chains 82 of the discharge conveyor. The rollers 84 are movable between a raised position, shown in broken lines in FIG. 6, in which the rollers project above the chains 72 to enable kegs to move on the rollers over the chains, and a lowered position, shown in solid lines in FIG. 6, in which the rollers are below the tops of the chains so that kegs can be discharged on the chains. To this end, the rollers 84 are mounted in a sub-frame 86 which is pivoted on a horizontal shaft 88 fixed to the main frame 10 of the apparatus, and an air cylinder 90 acting between the main frame 10 and the sub-frame 86 acts to lift the sub-frame to the raised position. A power driven roller 92 is positioned between the discharge table 18 and the discharge conveyor 80 to facilitate movement of kegs from the discharge table to the discharge conveyor.

In operation of the apparatus, with the carriage 16 positioned at the unloading station 14 and with the flap 42 in the raised position, a pallet 94 loaded with four kegs is moved on conveyor 12 into the unloading station until the pallet engages the retractable stops 15. The air cylinder 54 is then actuated to move the flap 42 to its lowered position. During this movement the bar 60 engages the two kegs 98 adjacent the flap 42 and pushes the array of kegs rearwards. The other two kegs 96 engage the bar 42 on pusher plate 40, and the force of the bar 60 on flap 42 causes the kegs to tilt until the upper rims of the rearmost two kegs engage the pusher plate 40. The air cylinder 36 is actuated to move the carriage 16 to its position above the discharge table 18. During this movement the kegs are pushed from the pallet onto the discharge table, the chains being driven to facilitate movement of kegs onto the table. The tilting of the kegs means that only the rear edges of the kegs are dragged over the pallet, so that there is no danger of the kegs catching against the pallet slats. The discharge plate 74 enables the kegs to be moved easily onto the discharge table even if the upper face of the pallet is lower than the expected level, for example if a slat or the bottom runner of the pallet is missing at the side of the pallet adjacent the discharge table. During movement of the kegs, the stop plate 44 and side guide bar 64 prevent the kegs from moving sideways.

When the carriage 16 has reached the end of its movement, the flap 42 is raised, to allow the kegs to resume their upright position on the discharge table 18. The carriage is then returned to its initial position, with the flap 42 in the raised position to clear the kegs on the discharge table. The kegs are moved two at a time on the chains 70 onto the discharge conveyor 80. As each pair of kegs is moved onto the conveyor 80, the rollers 84 are lowered to deposit the kegs on the chains 82, on which the kegs are discharged, the rollers then being raised to receive the next pair of kegs.

When the carriage 16 has resumed its initial position, the stops 15 are retracted to allow the empty pallet to be discharged, and at the same time the next full pallet is moved to the unloading station and the cycle is repeated.

It will be appreciated that modifications could be made in the described embodiment. For example, a rack and pinion mechanism could be provided for reciprocating the carriage instead of an air cylinder. The pallet conveyor could be a power roller conveyor. The stop plate 44 could be provided with parallel rollers rotatable about vertical axis to reduce friction between the kegs and the stop plate during retraction of the carriage. The side guide bar 64 of the carriage could be replaced by a retractable side plate slidable into position by means of an air cylinder. The side plate could also be provided with vertical rollers.

The apparatus could be used for de-palletizing articles other than kegs, in particular other cylindrical or barrel-shaped articles. The apparatus could be made fully automatic in operation, using suitable position sensing means and control circuits of known kind.

I claim:

1. In a de-palletizer for removing articles such as kegs or drums from a pallet where the de-palletizer is of the type having
   (a) a pallet conveyor for moving loaded pallets to an unloading station,
   (b) pusher means for pushing articles from a pallet at the unloading station onto a discharge table, and
   (c) means for discharging articles from the discharge table, the improvement wherein the pusher means includes tilting means for tilting articles on edge in the direction opposite to the direction in which the articles are pushed from the pallet onto the discharge table, the tilting means traveling with the articles as the articles are pushed along the pallet.

2. The improvement according to claim 1, wherein the pusher means includes
a horizontally movable carriage
and the tilting means comprise
   (i) a pusher disposed at the rear of the movable carriage, the pusher having a protrusion for engaging the lower portion of adjacent articles on the pallet, and
   (ii) a retractable member disposed at the front of the movable carriage for engaging articles on the pallet and causing the articles to tilt on edge away from their direction of movement toward the discharge table.

3. The improvement according to claim 2, in which the pusher comprises a plate provided at its lower end with a forwardly protruding bar for engaging the articles as they are tilted by the retractable member.

4. The improvement according to claim 3, in which the retractable member is a horizontal bar mounted on arms pivotally connected to the carriage for rotation about a horizontal axis vertically spaced from the horizontal bar.

5. The improvement according to claim 4, in which the retractable horizontal bar is fixed to a flap pivotally connected to the carriage whereby the retractable bar is movable between a lowered position in which the flap is substantially vertical and a raised position in which the bar is above articles loaded on the pallet.

6. The improvement according to claim 5, in which the carriage includes guides positioned at the sides of the carriage and extending at right angles to the pusher to prevent lateral movement of articles as they are moved by the pusher, the guide on the side nearer the input side of the pallet conveyor being retractable to allow a loaded pallet to enter the unloading station.

7. The improvement according to claim 6, in which the retractable side guide is a horizontal bar pivotally connected at one end to the flap and at the other end to an arm that is parallel to the flap and is mounted on the carriage to pivot about a horizontal axis parallel to the pivotal axis of the flap.

* * * * *